United States Patent [19]

Daley et al.

[11] 4,278,148

[45] Jul. 14, 1981

[54] SAWHORSE

[76] Inventors: Philip A. Daley, Rte. 1, Box 33Y, Ragley, La. 70657; Allan R. Mouhot, Rte. 7, Box 732; Dan C. Felice, Rte. 1, Box 707, Lot 105, both of Lake Charles, La. 70601

[21] Appl. No.: 93,452

[22] Filed: Nov. 13, 1979

[51] Int. Cl.$^{3}$ .......... F16M 11/00

[52] U.S. Cl. .......... 182/181; 182/224

[58] Field of Search .......... 182/181, 182, 183, 184, 182/185, 224, 225, 227

[56] References Cited

U.S. PATENT DOCUMENTS

| | | | |
|---|---|---|---|
| 302,945 | 8/1884 | Sargent | 182/181 |
| 1,553,045 | 9/1925 | Jones | 182/184 |
| 1,936,196 | 11/1933 | Kacena | 182/224 |
| 2,161,239 | 6/1939 | Thomson | 182/184 |
| 2,689,154 | 9/1954 | Redler | 182/186 |
| 2,816,805 | 12/1957 | Vaughn | 182/181 |
| 2,854,290 | 9/1958 | Steen | 182/181 |
| 3,139,950 | 7/1964 | Borgmann | 182/184 |
| 3,266,595 | 8/1966 | Borgmann | 182/181 |
| 3,613,831 | 10/1971 | Estep | 182/181 |
| 3,704,849 | 12/1972 | Green | 182/181 |
| 3,934,676 | 1/1976 | Rice | 182/182 |

*Primary Examiner*—Reinaldo P. Machado

*Attorney, Agent, or Firm*—David L. Ray; Edgar E. Spielman, Jr.

[57] ABSTRACT

A sawhorse which may be quickly and easily assembled and disassembled including a wooden stringer, a metal stringer connectable to the wooden stringer, two A-frames connectable to the metal stringer, each A-frame including a pair of outwardly sloping legs and a transverse strut rigidly fixed between the legs, a brace connectable to each of the A-frames and to the metal stringer, each of the braces being connectable to a strut on the A-frame and to the metal stringer.

1 Claim, 4 Drawing Figures

SAWHORSE

BACKGROUND OF THE INVENTION

This invention relates to horses of the type used by carpenters, blasters, painters, and other tradesmen, and in particular to horses which may be readily assembled for use and disassembled for economical shipment and storage.

Numerous varieties of horses are known in the art which may be disassembled. Exemplary of such horses are U.S. Pat. Nos. 3,266,595; 3,139,950; 2,816,805; 2,161,239; and, 1,936,196.

Such trestles or horses are used by carpenters as a sawhorse or by other tradesmen such as plasterers or painters to support planks or other staging upon which to work. On the whole, however, such trestles have two defects of significance. One defect is that they are insufficiently stable, and the second defect is that they are uneconomical in the cost of manufacture.

SUMMARY OF THE INVENTION

In accordance with the present invention there is provided a sawhorse comprising a wooden stringer, a metal stringer connectable to the wooden stringer, two A-frames connectable to the metal stringer, each A-frame including a pair of outwardly sloping legs and a transverse strut rigidly fixed thereto, a brace connecting each of said A-frames to the metal stringer, each of the braces being connected to a strut on the A-frame and to the metal stringer.

DESCRIPTION OF THE PREFERRED EMBODIMENTS

Figure 1:
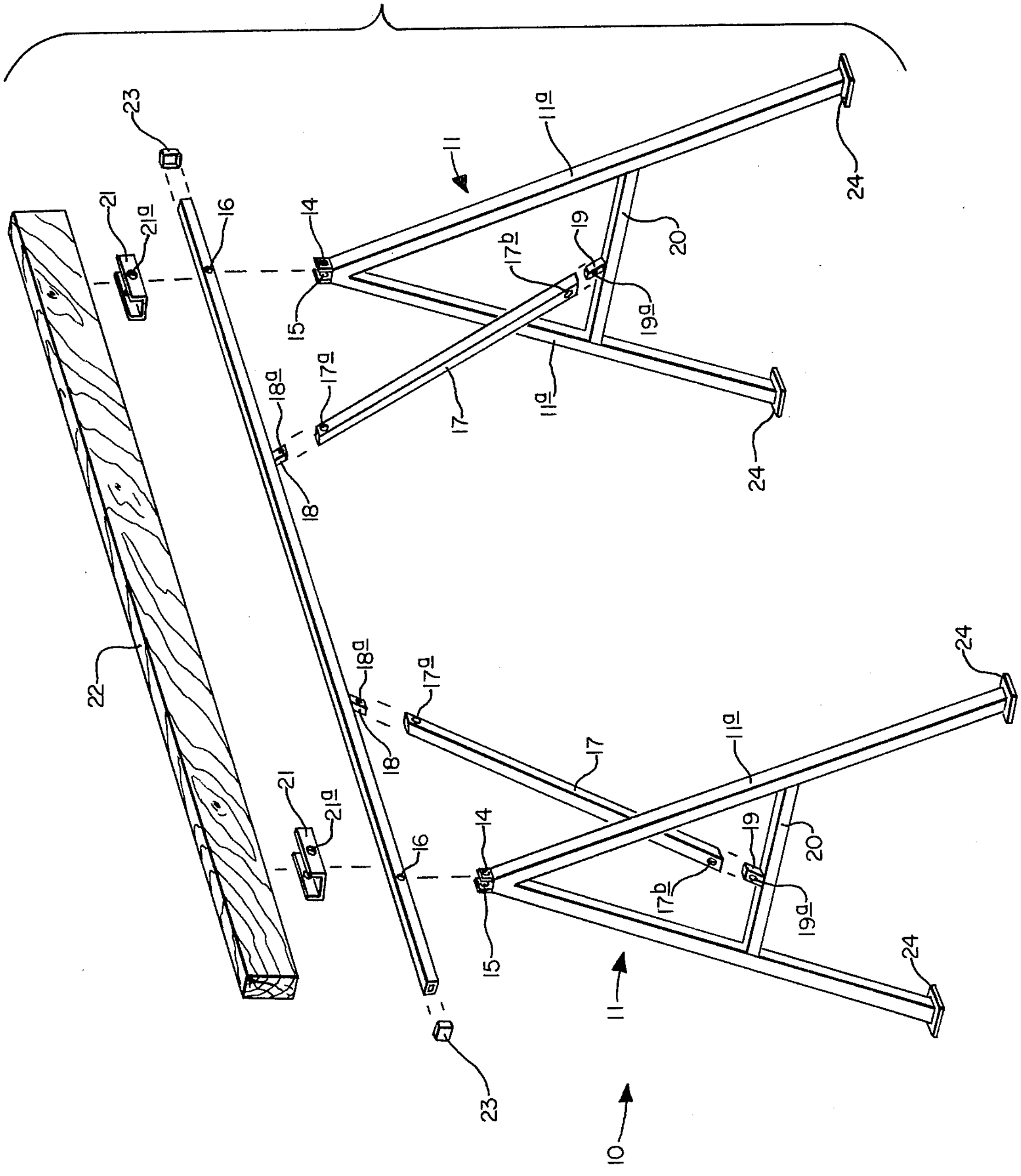
FIG. 1 is an exploded, perspective view of the invention.

Referring now to the drawings wherein like numerals refer to like and corresponding parts throughout the several views; the horse, generally indicated by the numeral 10, includes a pair of A-frames 11-11 supporting a metal stringer 12. A-frames 11-11 have four legs 11*a* with struts 20-20 therebetween which are rigidly connected thereto. Metal stringer 12 is connected to A-frames 11-11 by means of two pins or bolts 13-13 shown in FIG. 2 which are inserted through the holes 14-14 in brackets 15-15 which are connected to the upper ends of A-frames 11-11, and through holes 16-16 in metal stringer 12.

Figure 2:
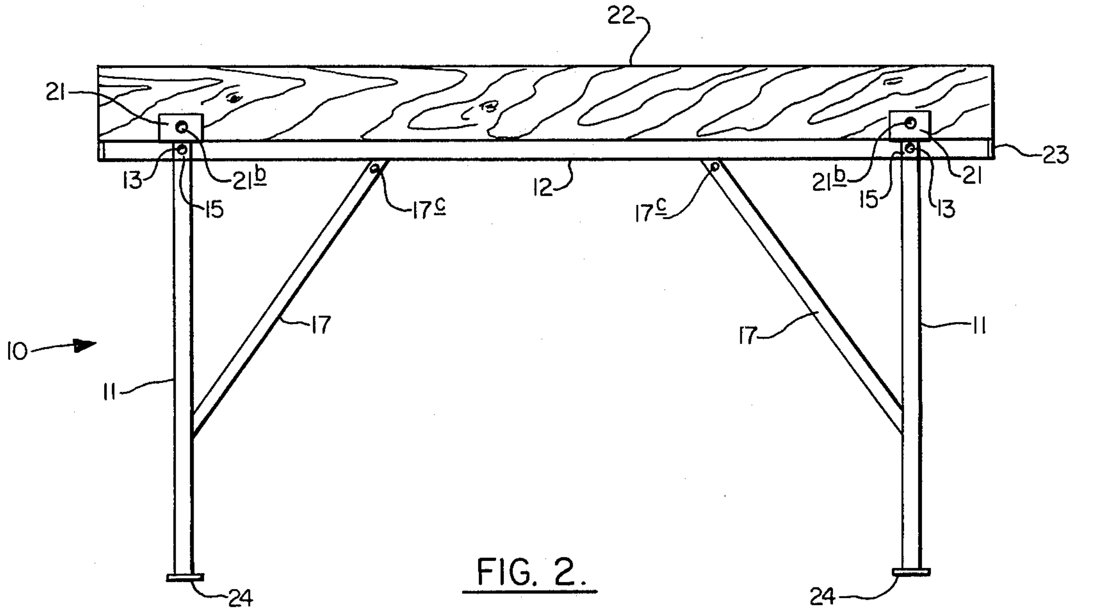
FIG. 2 is a side elevational view of the invention.
Figure 3:
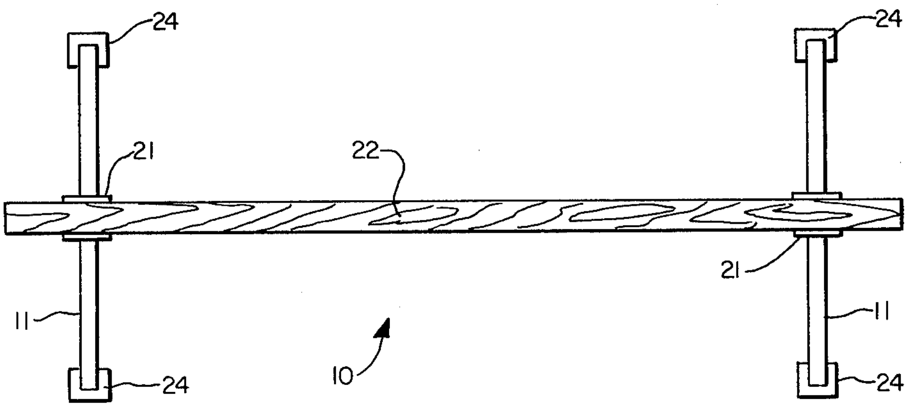
FIG. 3 is a top plan view of the invention.
Figure 4:
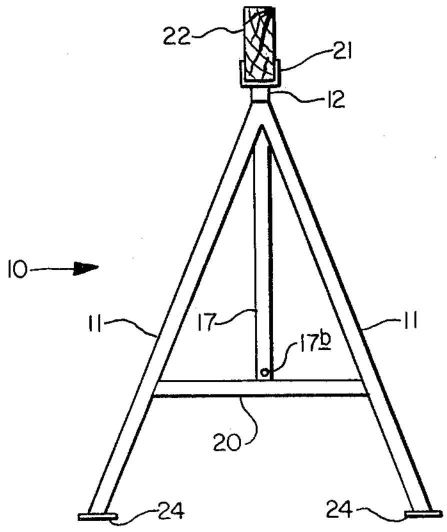
FIG. 4 is an end elevational view of the invention.

Additionally, A-frames 11-11 are connected to metal stringer 12 by means of two braces 17-17. Braces 17-17 are connected to rectangularly-shaped guides 18 and 19 located on stringer 12 and strut 20, respectively. Braces 17-17 telescope onto rectangularly-shaped guides 18-18 which are rigidly connected to metal stringer 12 and 19-19 which are rigidly connected to struts 20-20 on A-frames 11-11. Guides 18-18 and 19-19 have holes 18*a*-18*a* and 19*a*-19*a* therein which align with holes 17*a*-17*a* and 17*b*-17*b* in braces 17-17 for receipt of pin or bolt 17*c* shown in FIG. 2 and 17*d* shown in FIG. 4, which rigidly connect brace 17 to strut 20 and metal stringer 12.

Connected to the top of metal stringer 12 are two brackets 21-21 which are welded or otherwise rigidly connected to metal stringer 12. Brackets 21-21 have holes 21*a*-21*a* therein through which can be inserted bolts or pins 21*b*-21*b* shown in FIG. 2 to secure wooden stringer 22 to metal stringer 12.

Preferably, metal stringer 12 has two end caps 23-23 which may be made of plastic or metal and snapped into the ends of stringer 12. Also preferably, the A-frames 11-11 have pads 24 connected to the bottom of the A-frame legs to help maintain the stability of the sawhorse and prevent the sawhorse from scratching the floors on which it is used.

From the foregoing discussion, the assembly and disassembly of the present invention will be obvious to those of ordinary skill in the art. The various members can be easily bolted or pinned together to form a rigid and light-weight sawhorse. Preferably, metal tubing is used which is rectangular in cross-section. Such tubing is light-weight, inexpensive, and widely available.

As will also be obvious to those of skill in the art, the invention can be easily assembled in a flat package which is economical to transport. Furthermore, it will be seen that the assembly of the present invention is simple and can be carried out rapidly.

Having fully described the preferred embodiments of the present invention, it is desired that it be limited only within the spirit and scope of the present claims.

What is claimed:

1. A sawhorse comprising a wooden stringer, a metal stringer connectable to said wooden stringer, two A-frames including a pair of outwardly sloping legs and a transverse strut rigidly fixed between said legs, and braces between said frames and stringer, said A-frames having connected at the top thereof a vertical U-shaped first bracket having holes in the sides thereof, said first bracket being adapted to receive said metal stringer, said metal stringer having two holes therein alignable with said holes in said first bracket connected to said A-frame for receipt of a pin or bolt, and said metal stringer and said strut having guide means rigidly connected thereto for receipt of said braces, said guide means on said strut and said metal stringer having holes therein and said braces having holes therein, said holes in said braces and guides being aligned for receipt of a pin or bolt, said metal stringer having a U-shaped bracket means connected thereto, said second bracket means being adapted to receive said wooden stringer, said second bracket means having holes therein for insertion of a pin or bolt, said metal stringer having cap means connected thereto and said legs of said A-frames having foot means connected thereto, two braces connecting each of said A-frames to said metal stringer, each of said braces being connected to one of said struts on one of said A-frames and to said metal stringer.

* * * * *